US008189011B2

(12) United States Patent
Van de Sluis et al.

(10) Patent No.: US 8,189,011 B2
(45) Date of Patent: May 29, 2012

(54) SYSTEM AND METHOD FOR CONTROLLING LIGHTING SYSTEMS

(75) Inventors: Bartel Marinus Van de Sluis, Eindhoven (NL); Galileo June Destura, Eindhoven (NL); Martin Jacobus Johan Jak, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1011 days.

(21) Appl. No.: 12/097,524

(22) PCT Filed: Dec. 13, 2006

(86) PCT No.: PCT/IB2006/054808
§ 371 (c)(1),
(2), (4) Date: Jun. 14, 2008

(87) PCT Pub. No.: WO2007/072325
PCT Pub. Date: Jun. 28, 2007

(65) Prior Publication Data

US 2008/0265802 A1 Oct. 30, 2008

(30) Foreign Application Priority Data

Dec. 22, 2005 (EP) .................................... 05112812

(51) Int. Cl.

| | |
|---|---|
| ***G09G 5/00*** | (2006.01) |
| ***G09G 3/30*** | (2006.01) |
| ***G06K 9/00*** | (2006.01) |
| ***H04N 5/57*** | (2006.01) |
| ***H04N 9/30*** | (2006.01) |

(52) U.S. Cl. .......... 345/594; 345/77; 345/581; 345/619; 345/156; 348/603; 348/802; 382/165; 358/512

(58) Field of Classification Search .................... 345/22, 345/46, 48, 50–51, 63, 72–77, 82–90, 581, 345/589, 619, 156, 169–170, 173, 204, 690, 345/902; 348/739, 742, 749–750, 800–801, 348/802, 571, 603, 687; 358/509–510, 512; 382/162, 167, 254, 274, 165; 715/700, 764, 715/856, 857
See application file for complete search history.

(56) References Cited

U.S. PATENT DOCUMENTS 5,557,300 A * 9/1996 Satoh ........................... 345/170
(Continued)

FOREIGN PATENT DOCUMENTS

DE 10127023 A1 12/2002
(Continued)

OTHER PUBLICATIONS

"Method of Edit Color Replacement for Use With Bitmaps"; IBM Technical Disclosure Bulletin, IBM Corp., New York, NY, vol. 37, No. 2B., Feb. 1, 1994, p. 517.
"Menu Display Method for Color Palette Selection"; IBM Technical Disclosure Bulletin, IBM Corp. New York, NY, vol. 31, No. 6, Nov. 1988, pp. 246-247.

(Continued)

*Primary Examiner* — Wesner Sajous
(74) *Attorney, Agent, or Firm* — Mark L. Beloborodov

(57) ABSTRACT

A light panel (115, 215, 403, 503, 513, 603, 605) having a predetermined number of emitted color options and a processor (113, 213) operably coupled to the light panel (115, 215, 403, 503, 513, 603, 605). The processor (113, 213) responds to a first color selection actuation by controlling the light panel (115, 215, 403, 503, 513, 603, 605) to display each of the predetermined emitted light options within different portions of the light panel (115, 215, 403, 503, 513, 603, 605). Thereafter, the processor (113, 213) responds to a second color selection actuation by controlling the light panel (115, 215, 403, 503, 513, 603, 605) to display a selected one of the predetermined emitted light options substantially over the light panel (115, 215, 403, 503, 513, 603, 605), wherein the selected one of the predetermined emitted light options is indicated by the second color selection actuation.

20 Claims, 5 Drawing Sheets

U.S. PATENT DOCUMENTS

| | | | | |
|---|---|---|---|---|
| 5,719,622 | A * | 2/1998 | Conway | 348/211.8 |
| 6,888,529 | B2 * | 5/2005 | Bruning et al. | 345/102 |
| 7,102,616 | B1 * | 9/2006 | Sleator | 345/158 |
| 2005/0040774 | A1 | 2/2005 | Mueller et al. | |
| 2006/0028822 | A1 * | 2/2006 | Tanamachi et al. | 362/293 |
| 2008/0297469 | A1 * | 12/2008 | Drader et al. | 345/102 |

FOREIGN PATENT DOCUMENTS

| | | | |
|---|---|---|---|
| EP | 1113709 | A2 | 7/2001 |
| WO | WO2005029395 | A2 | 3/2005 |
| WO | WO2007004097 | A1 | 1/2007 |

OTHER PUBLICATIONS

"Combination Wireless Mouse and Laser Pointer"; IBM Corporation, Research Disclosure, Mason Publications, Hampshire, Great Britain, vol. 435, No. 171, Jul. 2000, One Page Document.

"Color-Conscious Icons"; IBM Technical Disclosure Bulletin, IBM Corp., New York, NY, vol. 37, No. 2A, Feb. 1, 1994, pp. 247-248.

"Wireless Mouse" IBM Technical Disclosure Bulletin, IBM Corp., New York, NY, US, vol. 31, No. 10, Mar. 1, 1989, pp. 28-29.

* cited by examiner

SYSTEM AND METHOD FOR CONTROLLING LIGHTING SYSTEMS

Lighting systems used in commercial entities such as retail shops, pleasure grounds, discotheques, and private households are able to create essentially any color or attractive atmosphere. Through the use of several lighting elements contained within a system, the system has the ability to emit different colors. The different colors are usually based on preset choices. Lighting systems can be combined to form unusual or eye-catching multiple system arrangements. In home environments, multiple system arrangements can be used and positioned in standard vertical or horizontal alignments, a combination of horizontal or vertical alignments, or arbitrary arrangements suitable for the household resident. In commercial entities, multiple system arrangements provide attractive, colored displaying options for products, and provide an attractive atmosphere, e.g. in combination with music in a discotheque.

In systems that have an ability to display multiple color offerings, a key problem is control of the color for each individual system. For example, if a shop manager desires to draw attention to shelved products located in front of one particular system, the shop manager will likely have to remove rows of product to adjust that system to the desired color. This problem is only exacerbated if the shop manager desires the different systems of the arrangement to each emit a different color, or the shop manager modifies the colors frequently. In a private household, the lighting system arrangement may be located at a height or distance not easily accessible by the resident, requiring the use of ladders and other implements to modify the colors of the system.

Pointing devices, such as remote control devices, allow for interface with a distant or not easily accessible object, providing the user a means of modifying the object while avoiding the difficulty and inefficiency of having to directly approach the object. Pointing devices and remote control devices utilize electromagnetic beams, such as beams of light, for interacting with the objects. Light receiving elements in the object are used for sensing the beam of light. Typically the beam of light is in the form of light pulses that are directly interpreted as control signals.

Pointing devices may also be utilized for controlling light panels in a similar way. In some cases, the pointing device may be utilized to select options displayed on the light panel. International Patent Publication WO 2005/029395 ("the '395 Publication"), incorporated herein by reference thereto as if set out in entirety, uses a coordinate detection system comprised of a light guiding layer in a light panel to sense and detect where a beam of light emanating from a pointing device strikes the light panel to facilitate option selection.

However, current technology fails to show means and methods for easily and efficiently controlling a lighting system having preset color offerings.

It is an object of the present system to overcome these and other disadvantages in the prior art.

The present system provides means and methods for easily and efficiently modifying the color of a lighting system. In accordance with the present system, a device for the wireless control of the color of light emitted by a lighting system is provided, wherein such device includes a signal generating means, a signal transmission means. The lighting system further includes a signal receiving means and a means for controlling the color of light emitted from the lighting elements.

In accordance with an embodiment of the present system, a device is provided for the wireless control of the color of light by a lighting system, such device includes a light panel having a predetermined number of emitted color options and a processor operably coupled to the light panel. The processor responds to a first color selection actuation by controlling the light panel to display each of the predetermined emitted light options within different portions of the light panel. Thereafter, the processor responds to a second color selection actuation by controlling the light panel to display a selected one of the predetermined emitted light options substantially over the light panel, wherein the selected one of the predetermined emitted light options is indicated by the second color selection actuation.

In accordance with another embodiment of the present system, a method is provided for modifying the color of a lighting system wirelessly, including directing a wireless device, activating the device, transmitting a beam of light from the device to a lighting system, manipulating the device through movement in order to direct the beam of light position on the lighting system, and changing the color of the lighting system by pressing a button on the device.

In accordance with a further embodiment of the present system, a method is provided for modifying the color of a lighting system wirelessly comprising directing a wireless device, activating said device, transmitting a signal from the device to a lighting system, receiving a signal from the lighting system, storing the signal in the device, manipulating the device, for example, by changing the direction from the first lighting system to a second lighting system, and changing the color of the second lighting system by pressing a button on the device.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods, such as power supply systems for the lights, etc., are omitted so as not to obscure the description of the present system.

It should be expressly understood that the drawings are included for illustrative purposes and do not represent the scope of the present system. In the accompanying drawings, like reference numbers in different drawings designate similar elements.

As used herein, the terms used for a device for wireless control may include "remote control unit", "remote control", and "pointing device". These terms are to be understood as having the same meaning and hence being interchangeable throughout the detailed description to follow.

The term "lighting system" as used throughout includes but is not limited to lighting panels, signage systems, flexible (rope) lighting, tube lighting, and shelf lighting systems.

Throughout this description, the term "button" is used in reference to the actuation device for activating the pointing device. As a person skilled in the art will realize, the term "button" also refers to other actuation devices including a switch, mechanical button, a touch sensitive display screen, and voice activation.

Before turning to the illustrative description of using remote control devices to modify the color of a lighting system, a few configurations of lighting systems and remote control devices follows, illustrating, for example, that lighting systems may comprise any number of lighting elements and that communication channels between remote control devices and lighting systems may be unidirectional as well as bi-directional. The remote control devices that are illustrated in FIGS. 1 and 2 may be any devices for wireless control including those that are discussed in European Patent Application Serial No. EP 05105915.2, entitled "Remote Color Control Device and Lighting System", filed on Jun. 30, 2005, the contents of which are incorporated herein by reference in its entirety.

The lighting elements that form part of the described systems are capable of reproducing visible light having a plurality of desired colors and intensities. The lighting elements may be realized in the form of multi-color light emitting diode (LED) devices that, for example, conform to the RGB system of colors. Nevertheless, any other suitable controllable multi-color light emitting elements may be used without departing from the scope of the present system.

Figure 1:
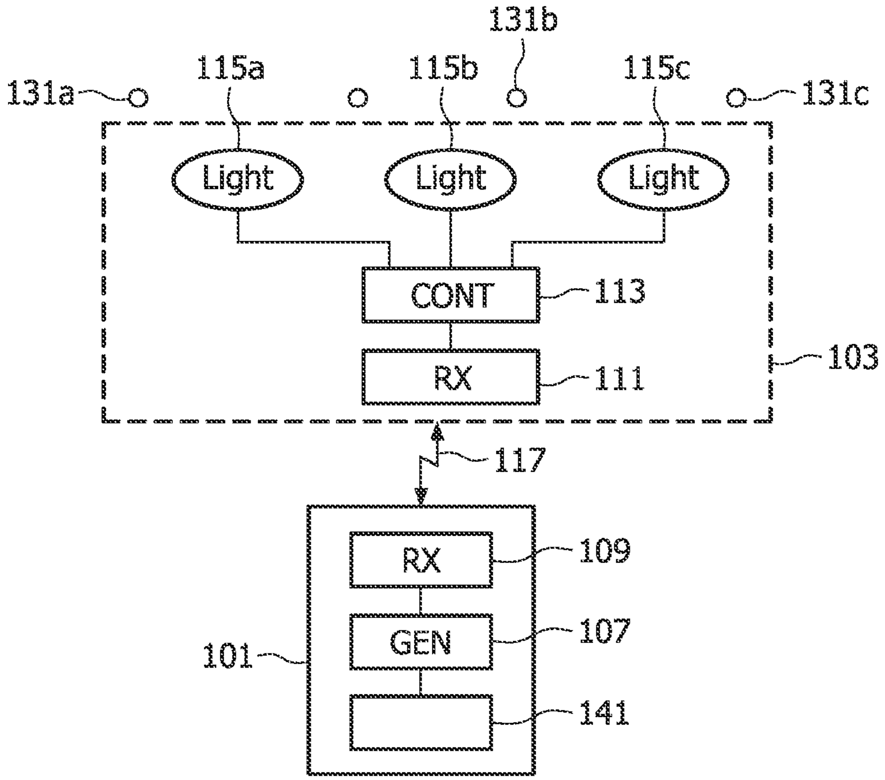
FIG. 1 is diagram in accordance with an embodiment of the present system including a wireless control suitable for use in conjunction with a lighting system.
Figure 2:
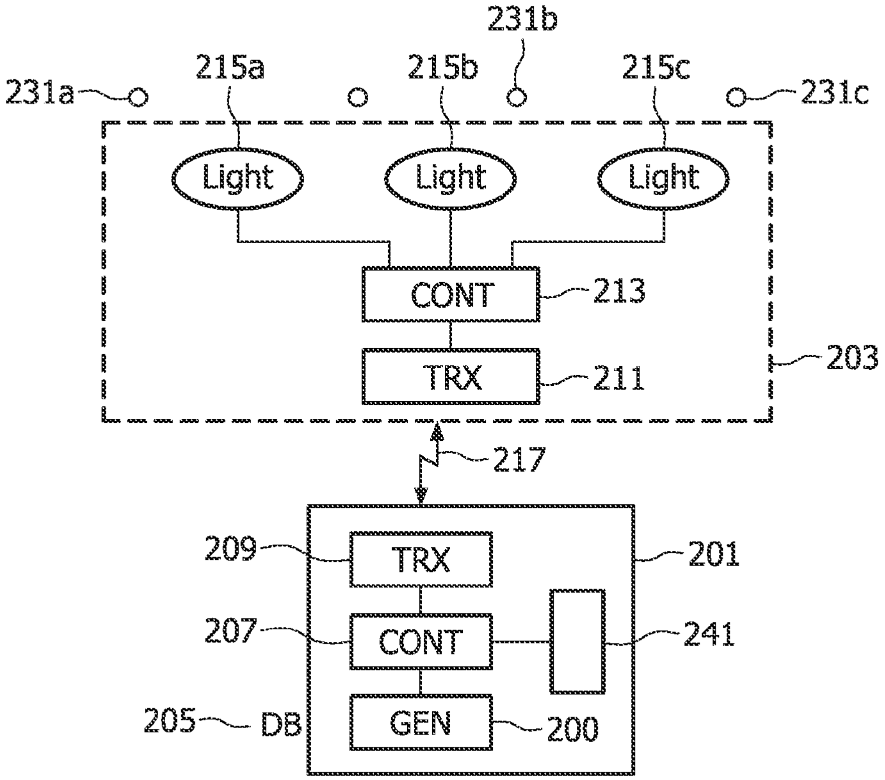
FIG. 2 is an embodiment of a wireless device for use in accordance with the present system, used in conjunction with a lighting system.

FIG. 1 shows a basic configuration of a remote control device 101 for wireless control of colors 131*a-c* of lights emitted by a lighting system 103. The remote control device 101 includes electric circuitry that is divided, at least in logical terms, into a generator 107 and a signal transmitter 109. Moreover, the different units may be realized in multiple ways including hardware circuitry, programmable circuits utilizing appropriate software to operate in accordance with the present system, and combinations of hardware circuits and programmable circuits.

The signal transmitter 109 is configured to transmit a signal 117. As will be discussed below, the signal 117 is preferably transmitted as a more or less focused (e.g., narrow) beam of electromagnetic radiation. The signal 117 is received by a receiver 111 in a lighting system 103 that also includes a plurality of lighting elements 115*a-c* as well as a controller 113. Each of the lighting elements 115*a-c* are individually controllable via the controller 113 to emit light 131*a-c* having a given characteristics, such as color and intensity. As a person of ordinary skill in the art will understand, the system 103 may comprise any number of lighting elements arranged in any desired spatial configuration relative to each other, including a rectangular array of elements and more irregular distributions. In addition, the light 131*a-c* emitted may be distinctive and separate in one embodiment. However, in another embodiment, the light 131*a-c* emitted may be blurred together in portions as long as separate color portions are also present.

To facilitate the following discussion, adjusting a color characteristic of light will be described. However, as would be readily appreciated by a person of ordinary skill in the art, the following discussion also is applicably to controlling other characteristics of emitted light including intensity, hue, saturation, and the like.

FIG. 2 shows a basic configuration of a remote control device 201 for wireless control of color 231*a-c* of light emitted by a lighting system 203. The remote control device 201 comprises electronic circuitry that is divided, at least in logical terms, into a color information data generator 200, a controller 207, a transceiver 209, and a storage device 205, such as a memory.

The transceiver 209 is configured to operate a bi-directional communication channel 217 with a corresponding system transceiver 211 connected to a controller 213 in the lighting system 203. Information regarding desired characteristics of emitted light including an emitted color of light and information regarding desired and emitted intensity of light is exchanged via the bi-directional channel 217. The storage device 205 may store a database of such information such as data on previously selected color characteristics, including colors and intensities. The storage device 205 may provide the stored information to the color information data generator 200 as needed. The signal 217 is preferably transmitted as a more or less focused beam of electromagnetic radiation, although some embodiments that utilize a remote control device do not necessarily utilized a focused beam in order to function according to the present system.

The signal 217 is received by the receiver 211 in the lighting system 203 that also includes a plurality of lighting elements 215*a-c* coupled to the controller 213. The lighting elements 215*a-c* are individually controllable via the controller 213 to emit light 231*a-c* having a desired color and/or intensity. The system 203 may include any number of lighting elements arranged in any desired spatial configuration relative to each other, including a rectangular array of distinctive elements and more irregular distributions.

The remote control devices 101, 201 as embodied in FIGS. 1 and 2 may also contain respective actuating buttons 141, 241 for actuating the pointing device. The pointing devices may be actuated before or after being directed (e.g., pointed) at a lighting system. The devices in FIGS. 1 and 2 may be modified or adjusted, depending on desire and need. For example, the device 101 may be simply a laser pointer that emits a colored light (e.g., red) as is used to indicate a point of focus during displayed presentations. Further modification within the scope of the present system will become apparent to a person of ordinary skill in the art as the operation of the present system is described herein below.

It is also to be noted that the controllers of the systems discussed above may be configured to adjust characteristics of light emitted from the lighting elements gradually over a period of time. For example, the color of light emitted from the lighting elements may change gradually over a period of time. Moreover, in a system having several lighting elements, when a first lighting element has obtained a desired color as a result of control by a remote control device of the present system, one or several other lighting elements of the system may obtain the same color if desired.

To facilitate modification of an emitted characteristic of the lighting system, the present system provides an indication as to which characteristics may be emitted by that system prior to characteristic selection. For example, to modify the color of a lighting panel, the user is provided a visual perception of the colors displayable by that panel. To facilitate modification of an intensity emitted by the lighting system, the present system provides a visual indication as to which intensities may be emitted by that system prior to intensity selection.

Figure 3:
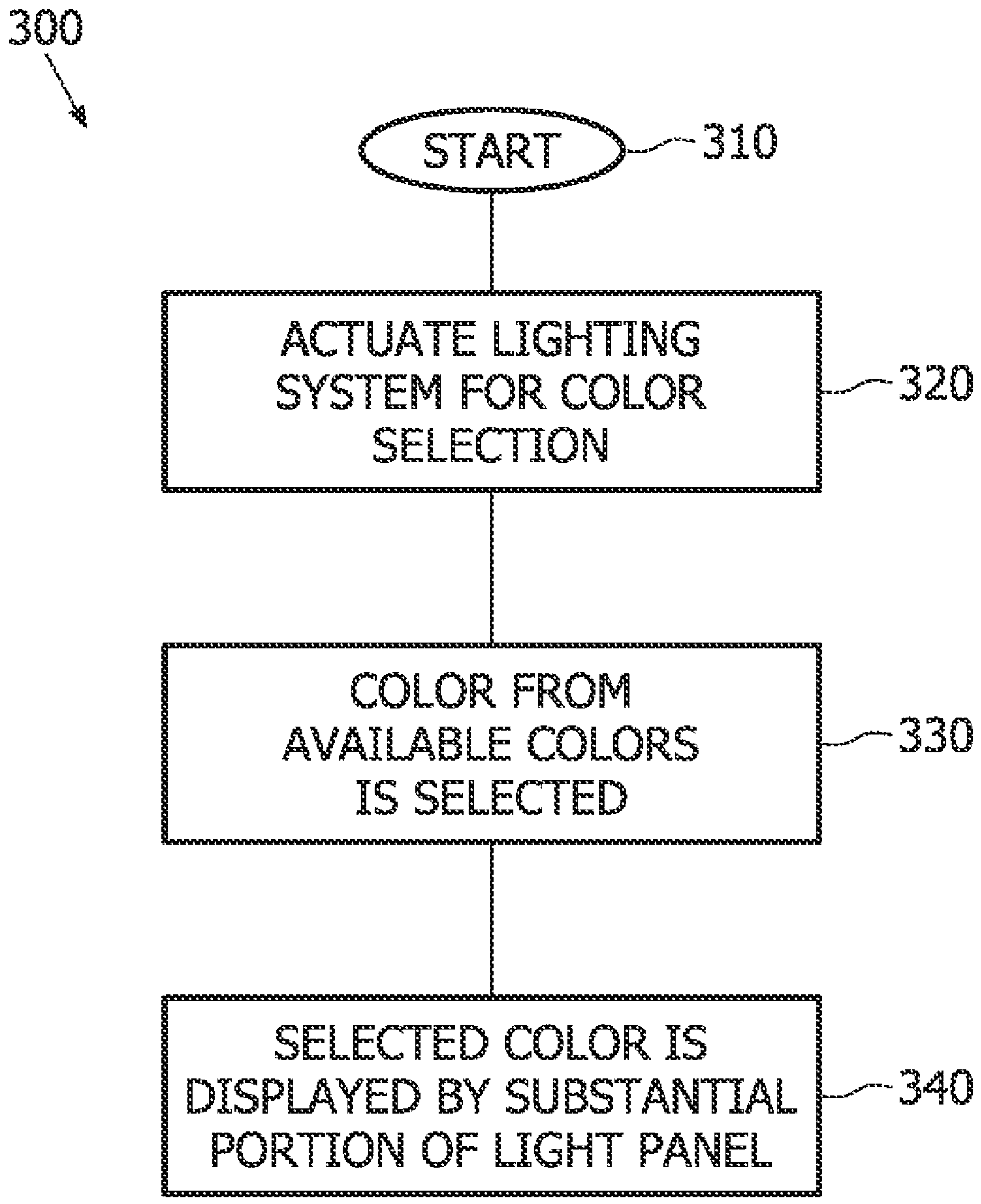
FIG. 3 is a flow chart for a method of modifying the color of a lighting system in accordance with an embodiment of the present system.
Figures 4A, 4B, 4C, 4D, 4E:
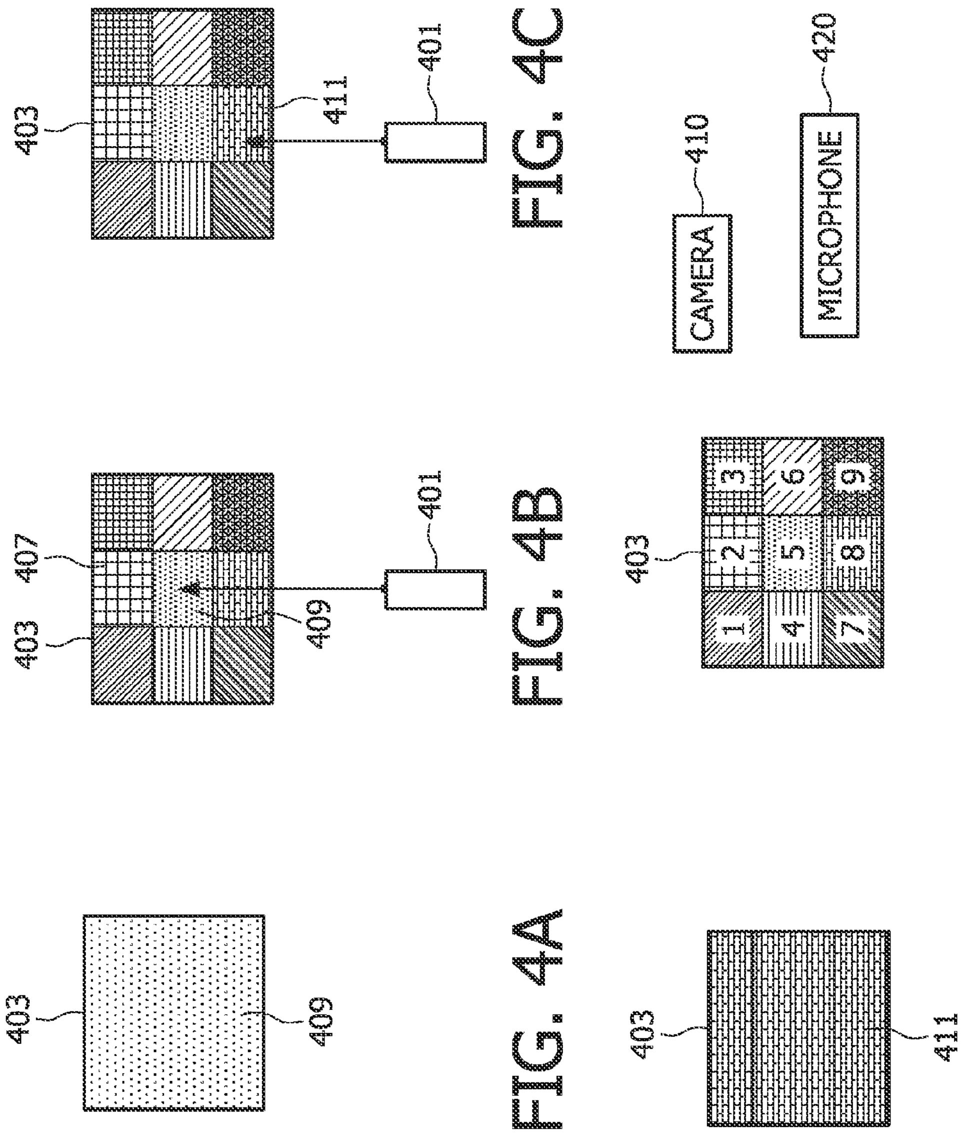
FIGS. 4A, 4B, 4C, 4D, 4E illustrate an embodiment of the present system wherein a wireless device is used in conjunction with a lighting panel including a device for exhibiting alternate, preset colors.

Further discussion of the present system will facilitated with reference to FIGS. 3 and 4A-4E. FIG. 3 shows a method of modifying the color of a lighting system using the present system. FIGS. 4A-4E show an embodiment of the method of modifying the color of a lighting system, wherein the lighting system is a lighting panel 403. FIG. 4A shows a current color 409 of the panel 403 prior to actuation at a starting act 310. Upon actuation of the lighting system during act 320, the panel 403 exhibits available colors 407 during a color selection mode. In the illustrative embodiment, actuation of the lighting system is performed by a user controlling an actuation device 401 (e.g., by depressing a button on the device) to produce a signal 417. The signal 417 is emitted from the pointing device 401 and is directed to the panel 403. The panel 403 responds to the signal 417 by entering the color selection mode. Illustratively, the signal 417 may be a light signal such as is emitted by a laser pointing device. However, other signals such as infrared (IR) signals, radio frequency (RF) signals, etc. may also be suitably utilized. Thereafter, during act 330, the user may direct the signal 417, to one of the displayed available colors 411 exhibited on the panel 403 to select a given color 411 as shown in FIG. 4C. During act 340 the panel 403 transitions to emitting the selected color 411 as shown in FIG. 4D.

By way of example, a suitable panel for use with the present system may be constructed in accordance with European Patent Application Serial No. 051049286.6, entitled "Illumination System," wherein a backlight system having a light guide is described. The system may include a plurality of lighting elements (e.g., LEDs, sub-panels, etc.) that may create different colored regions such as is shown in FIG. 4B. Illustratively, the system of detecting where an external light source impinges a coordinate system as described in the '395 Publication may be suitably utilized by the present system. However, clearly other systems may also be suitably utilized.

In a further embodiment, the lighting system 403 may indicate it is in-focus or in line to the device 401 by a producing a sensory indication, for example, flashing, producing an auditory signal, etc. during act 330. Further, actuation by the pointing device may occur by moving the signal 417 emitted by the pointing device 401 within one lighting system or between several lighting systems. Actuation (e.g., acts 320 and/or 330) may also occur by actuating and de-actuating the pointing device, or by actuating the pointing device prior to directing the pointing device toward the lighting system 403.

FIG. 4E shows a panel 403 that may be utilized in accordance with an embodiment of the present system wherein the panel 403, together with displaying available colors as shown previously, also displays panel indication designations, illustratively depicted as numbers (e.g., panels 1-9) to facilitate user color selection. In this embodiment, a user may utilize a voice input in place of the pointing device 401 for system actuation and for color selection. In this embodiment, act 320 (panel actuation for color selection) may be initiated by a voice command or other audible action that may be captured by microphone 420. Microphone 420 may be operably coupled to the controller 113 (see, FIG. 1) which identifies actuation, using for example voice recognition. Act 330 may be similarly performed using a voice designation of a desired panel color using the displayed panel indications. For example, the user may say "eight" or other similar terms to indicate that the user desires the panels 1-9 to be colored the same color as emitted by panel 8. Thereafter, operation may be similar as described above with the panels 1-9 changing to the color of panel 8 (e.g., see, FIG. 4D).

In another embodiment, the user may simply select panel 8 verbally without the panels displaying panel indication numbers, by for example, verbally describing the color emitted by a desired panel. For example, the user after viewing the available colors, may simply state, "green" or other words that are sufficient to differentiate a desired color from other available colors.

In a further embodiment, a user may simply point at the panel 403 to initiate act 320. The pointing may be captured by an image acquisition device, such as camera 410 which may be operably coupled to the controller 113. The controller 113, for example utilizing computer vision techniques, may identify both acts 320 and 330 for actuation and selection. These and other suitable methods of actuation and selection may be utilized as would readily be appreciated by a person of ordinary skill in the art.

While the light emitted by the lighting panel 403 may be distinctive, as for example shown in FIG. 4B, in other embodiments the light emitted by the panels may be blurred together in portions as long as separate color portions are also present.

Figure 5B:
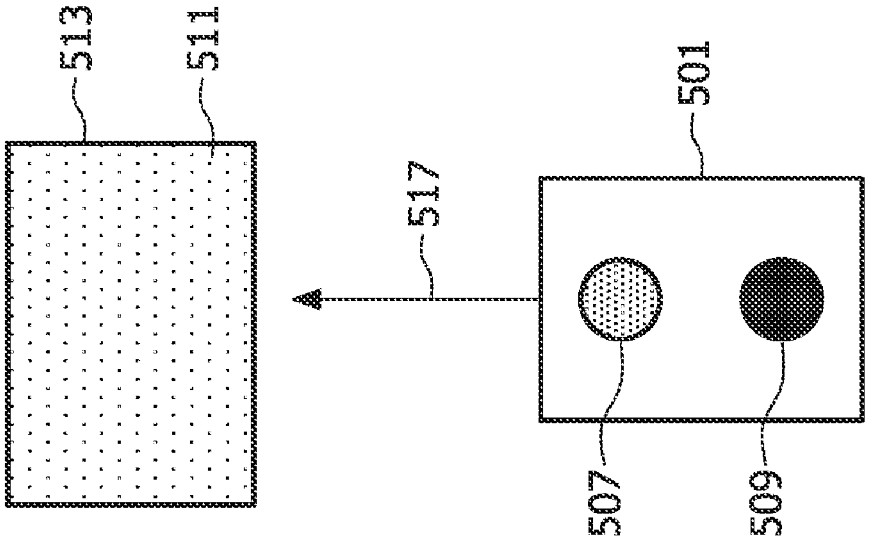
FIGS. 5A, 5B illustrate a method of modifying the color of a lighting system in accordance with an embodiment of the present system.
Figure 5A:
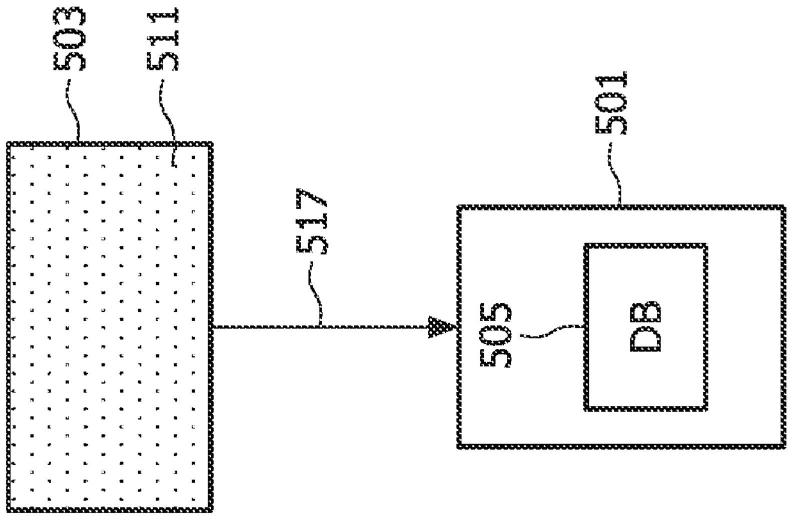

FIGS. 5A and 5B illustrate another embodiment of the present system wherein a previous selection of color for one panel (e.g., see, FIGS. 3 and 4), is utilized to modify a color of another panel (e.g., a copy and paste operation). FIG. 5A illustrates sometime after act 330, after the color 511 of panel 503 is already selected as described above for panel 403. Information 517, identifying the selected color 511, is received by the pointing device 501 (e.g., see, FIG. 2 which illustrates a bidirectional communication between the pointing device 201 and the lighting system 203). The information 517 may be sent by the controller 213 or may simply be determined from the color emitted by the panel 503 after color selection. The information 517 on the color 511 may thereafter be stored on a storage device 505. The user may then direct the device 501 to a second lighting system 513 and actuate a button 507 as shown in FIG. 5B. In response to actuation of the button 507, information 517 is transmitted from the storage device 505 of the device 501 to the second lighting system 513. The second lighting system 513 thereafter emits the color 511 of the first lighting system 503. To allow the user to review the color 511 of the first lighting system 503, the device may comprise a display panel 509, to view a stored color.

Figures 6A, 6B, 6C:
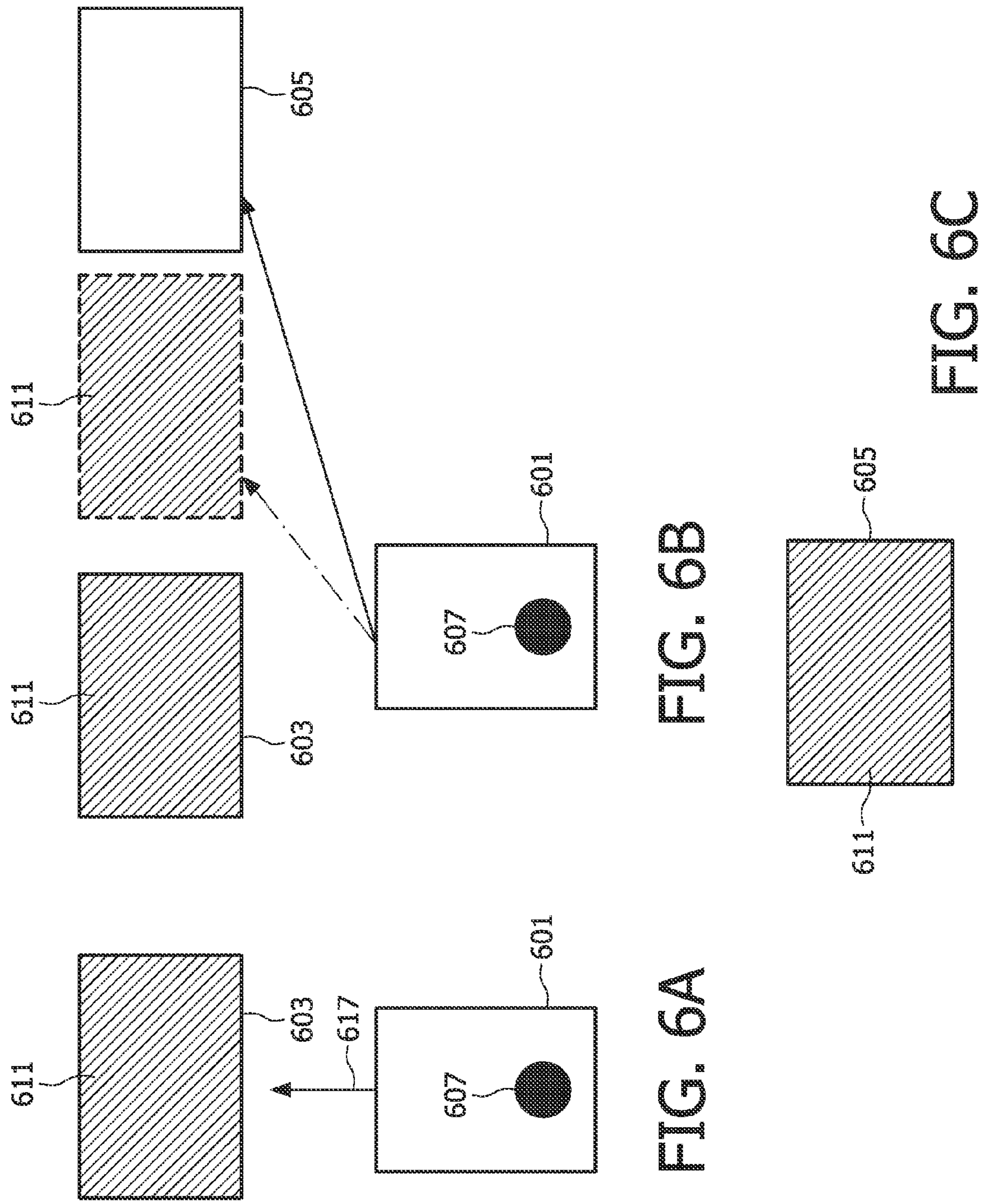
FIGS. 6A, 6B, 6C illustrate another method of modifying the color of a lighting system in accordance with an embodiment of the present system.

FIGS. 6A, 6B, 6C illustrate a further embodiment of a method of modifying the color of a lighting system, including the acts of dragging, and dropping a color from one lighting system to another. In use, after the modification of the color 611 of the lighting system 603, the pointing device 601 may be actuated again through an actuation button 607 and directed towards the lighting system 603 as shown in FIG. 6A. Thereafter, the pointing device 601 may be moved in the direction of a second lighting system 605 as shown in FIG. 6B. Upon de-actuation of the pointing device 601, for example by releasing the actuation button 607, the color 601 of the first lighting system 603 will be "dropped" onto the second lighting system 605. The second lighting system 605 sometime thereafter (e.g., a transition to) will exhibit the color 611 of the first lighting system 603 as shown in FIG. 6C.

As should be clear, any of the systems and devices illustratively described herein may be repeated one or more times within a given lighting application, as illustratively described with regard to FIG. 6. Each of these systems may be further controlled by one or more controllers depending on whether a given application warrants group or independent panel control.

Having described embodiments of the present system with reference to the accompanying drawings, it is to be understood that the present system is not limited to the precise embodiments, and that various changes and modifications may be effected therein by one having ordinary skill in the art including combinations of elements of various embodiment without departing from the scope or spirit as defined in the appended claims.

In interpreting the appended claims, it should be understood that:

a) the word “comprising” does not exclude the presence of other elements or acts than those listed in a given claim;

b) the word “a” or “an” preceding an element does not exclude the presence of a plurality of such elements;

c) any reference signs in the claims do not limit their scope;

d) several “means” may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

The invention claimed is:

1. A system for control of a light, the system comprising:

a light panel configured to have a predetermined number of emitted color options; and a processor operably coupled to the light panel, wherein the processor is configured to respond to a first color selection actuation by controlling the light panel to display each of the predetermined emitted light options within different portions of the light panel, and wherein the processor is configured to respond to a second color selection actuation by controlling the light panel to display a selected one of the predetermined emitted light options substantially over the light panel, the selected one of the predetermined emitted light options indicated by the second color selection actuation.

2. The system of claim 1, comprising a selection actuation device, configured to produce both of the first and second color selection actuations in response to user input.

3. The system of claim 2, wherein the selection actuation device is configured to produce a first electromagnetic signal that is the first color selection actuation, and is configured to produce a second electromagnetic signal that is the second color selection actuation.

4. The system of claim 3, wherein the selection actuation device is a laser pointer and the first and second electromagnetic signals are light signals.

5. The system of claim 3, wherein the selection actuation device is a radio frequency (RF) emitting device and the first and second electromagnetic signals are RF signals.

6. The system of claim 3, wherein the selection actuation device is configured to produce a narrow beam electromagnetic signal as the second electromagnetic signal.

7. The system of claim 3, wherein the processor is configured to detect a portion of the light panel where the second electromagnetic signal impinges on the light panel and the selected one of the predetermined emitted light options is the color of the detected portion of the light panel.

8. The system of claim 1, wherein processor is configured to produce a sensory signal in response to receipt of a second electromagnetic signal.

9. The system of claim 8, wherein the sensory signal is a flashing of a portion of the light panel that displays the selected one of the predetermined emitted light options.

10. The system of claim 8, wherein the light panel is a first light panel and the processor is a first processor, the system comprising:

a second light panel that is configured to operate substantially similar to the first light panel; and a second processor that is configured to operate substantially similar to the first processor, wherein the second processor is configured to respond to a third color selection actuation by controlling the second light panel to display the selected one of the predetermined emitted light options substantially over the second light panel.

11. The system of claim 10, wherein the third color selection actuation is a copy and paste actuation.

12. The system of claim 10, wherein the third color selection actuation is a drag and drop actuation.

13. The system of claim 1, comprising a microphone operably coupled to the processor and configured to receive auditory signals, wherein the first and second color selection actuations are auditory signals, and wherein the processor is configured to determine the first and second color selection actuations from received auditory signals.

14. The system of claim 1, comprising an image acquisition device operably coupled to the processor and configured to acquire images, wherein the first and second color selection actuations are pointing gesture signals, and wherein the processor is configured to identify the pointing gesture signals from the acquired images.

15. A method for controlling a light panel, the method comprising the acts of:

controlling the light panel to display each of a predetermined number of emitted light options within different portions of the light panel in response to a first color selection actuation; and controlling the light panel to display a selected one of the predetermined emitted light options substantially over the light panel, which is configured to have a predetermined number of emitted color options, in response to a second color selection actuation that indicates the selected one of the predetermined emitted light options.

16. The method of claim 15, comprising the acts of:

detecting a portion of the light panel where the second color selection actuation impinges on the light panel; and determining a color of the detected portion of the light panel, wherein controlling the light panel to display the selected one of the predetermined emitted light options comprises the act of controlling the light panel to display the color of the detected portion of the light panel.

17. The method of claim 15, comprising the act of producing a sensory signal in response to receipt of the second electromagnetic signal.

18. The method of claim 16, wherein the sensory signal is a visual sensory signal.

19. The method of claim 15, comprising the act of responding to a third color selection actuation by controlling an other light panel to display the selected one of the predetermined emitted light options substantially over the other light panel.

20. The method of claim 19, wherein the third color selection actuation is one of a copy and paste actuation and a drag and drop actuation.

* * * * *